April 15, 1969     P. J. BUCHMANN     3,438,585
SPREADER DEVICE
Filed Sept. 6, 1966     Sheet 2 of 2
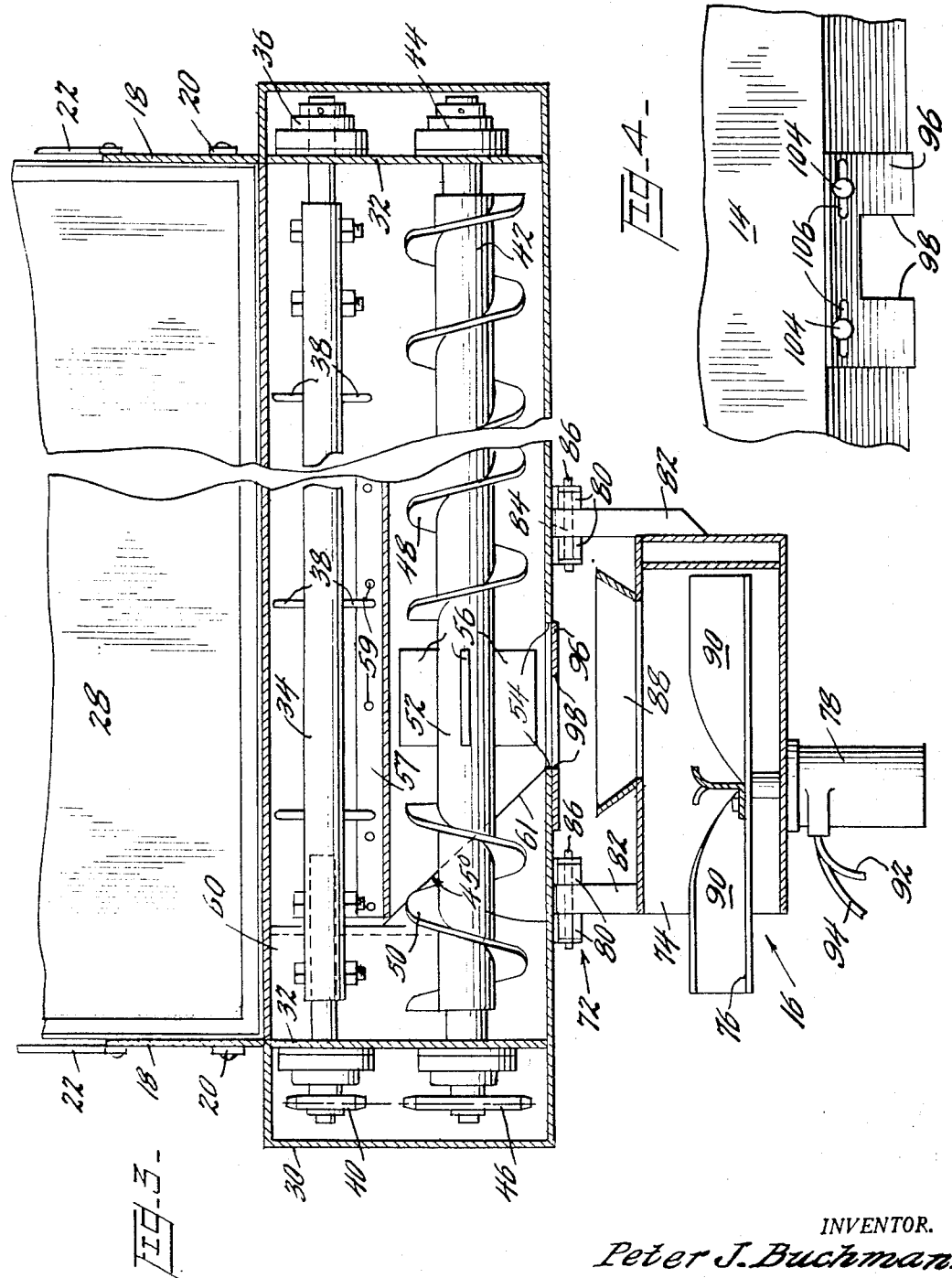
INVENTOR.
Peter J. Buchmann,
BY
ATTORNEYS

United States Patent Office 3,438,585
Patented Apr. 15, 1969

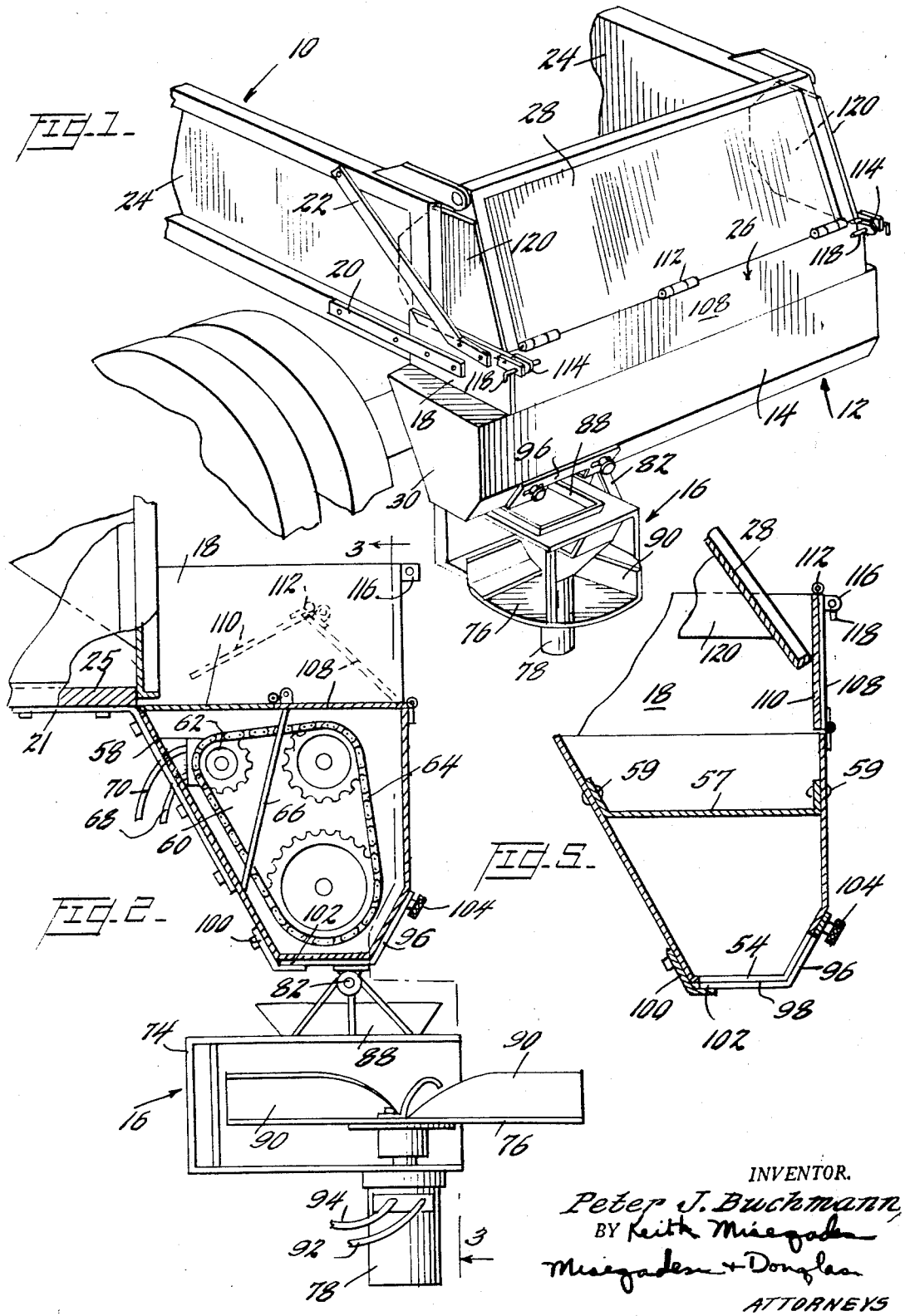

3,438,585
SPREADER DEVICE
Peter J. Buchmann, Green Bay, Wis., assignor, by mesne assignments, to Good Road Machinery Corporation, Minerva, Ohio
Filed Sept. 6, 1966, Ser. No. 577,553
Int. Cl. E01c 19/20; A01c 17/00, 3/06
U.S. Cl. 239—665        10 Claims

ABSTRACT OF THE DISCLOSURE

The invention disclosed is a granular material spreader which may be attached to the conventional dump truck or like vehicle and comprises an elongated well, located at the rear end of a dump truck load box, a breaker bar for clamps of granular material, an auger therebeneath for feeding material to a discharge port, a spinner assembly beneath the port to broadcast material, and a sliding plate adjacent the discharge port for varying the point of impingement of material on the spinner blades. A hinged cover is mounted over the well, to cover it when the dump truck is used in a normal manner, and pivotal to the rear of the well to block the tailgate and direct material into the well when the invention is employed.

---

This invention relates to spreader devices for attachment to a dump truck or like vehicle, for distributing particulate material such as salt, sand, or cinders.

Year round road maintenance can be an expensive project, particularly in those areas of the country that are subject to climatic extremes. In the rural areas of the Northern and Middle West States, the factor of expense is particularly significant in attempting to maintain second and third class roads open for use through winter snow and ice storms and during the hot, humid summer months when the problem of dust is likely to become unbearable. Although traffic density on many roads does not justify hard paving, the traffic on such roads is usually most dense in dry seasons at times when the dust created by traffic is most objectionable.

This invention is directed to providing means for dealing with such problems by providing a simple, yet durable spreader device which may be attached to the conventional dump truck or like vehicle and can be used to spread any type of granular material. In addition, the invention is so constructed and mounted as to not interfere with the load box or tailgate of the dump truck when the same is being used in the conventional manner. When in use, the invention may be used to spread material such as salt, sand, or cinders, for control of road surface ice during the winter months, or it may be used to spread stone chips or calcium chloride during the summer months, for controlling the dust problem.

Therefore, it is the principal object of this invention to provide a granular material spreading device for attachment to a conventional dump truck or similar vehicle.

It is another object of the invention to provide a spreader of the above type which will permit the ordinary operation and function of a dump truck, or other like vehicle.

Yet another object of the invention is to provide a granular material spreader of the above type having powered, rotary means for supplying varied, controlled quantities of homogeneous material to be spread over a road surface.

A further object of the invention is to provide blocking means, associated with the above discussed powered rotary means, which prevents undesired spilling material from the spreader device when the same is not in operation.

Finally, it is an object of the invention to provide a variable speed spinner assembly for spreading the granular material, which includes a housing around a portion thereof to prevent granular material from striking the vehicle to which the spreader is attached; means are also provided to vary the spread of granular material from the device.

Fuller and more complete objects of the present invention will become readily apparent by reference to the following specification and drawings in which:

FIG. 1 is a view in perspective of the invention as attached to the rear of a dump truck body;

FIG. 2 is a side sectional view of the invention;

FIG. 3 is a partial, sectional view of the invention taken along line 3—3 of FIG. 2;

FIG. 4 is a partial end view of the lower, left side of FIG. 1 and drawn to an enlarged scale; and FIG. 5 is a sectional view, similar to FIG. 2.

Referring now to the drawings by reference character, and in particular to FIG. 1 thereof, there is shown the rear portion of a dump truck 10 having the invention 12 mounted at the rear portion thereof. The invention includes an elongated material reception well 14, the top of which is coplanar with the bed of dump truck 10, a spinner assembly 16 for spreading granular material rearwardly of the truck 10, a pair of end support plates 18, 18, at either upper end of well 14, three pairs of bracing struts 20, 21 and 22, for securing the invention to side walls 24, 24 and beneath bed 25 of dump truck 10, and a removable cover plate 26, secured to the rear of the invention behind tailgate 28 of truck 10. Cover plate 26 in the position illustrated by FIG. 1, prevents tailgate 28 from swinging beyond the end of reception well 14 and thus helps to guide the granular material to be spread into reception well 14 where it is fed to spinner assembly 16.

Referring now to FIGS. 2 and 3 in particular, well 14 includes a pair of removable end cover plates 30, 30, and a pair of interior bearing plates 32, 32. A rotating delumping shaft 34 is rotatably secured at the upper rear end of well 14, through bearing plates 32 by a pair of bearings 36, 36. Shaft 34 is provided with a number of projecting studs 38 which serve to break up large, coalesced lumps of granular material as the same enters well 14 from dump truck 10. A sprocket 40 is provided at one end of shaft 34, exteriorly of bearing plate 32 for positive rotational drive of shaft 34. A rotatable auger 42 is mounted beneath delumping shaft 34 in bearing plates 32, by a pair of bearings 44, 44. Positive drive for auger 42 is provided by a sprocket 46 secured at one end of auger 42, exteriorly of bearing plate 32; sprocket 46 is arranged to rotate coplanar with sprocket 40.

Auger 42 includes two inversely faced helicoids 48 and 50 terminating at a threadless portion 52. An exit port 54 is cut into well 14 directly beneath threadless portion 52, and serves to feed the granular material to spinner assembly 16. A plurality of paddles 56 are arranged about threadless portion 52, and extend radially therefrom a distance substantially equal to the diameter of helicoids 48 and 50. As explained so far, granular material passes from the load box of dump truck 10 to the upper portion of well 14 where it is broken up into smaller particles by delumping shaft 34. Then it flows to auger 42 which directs the granular material to threadless portion 52 and the paddle arrangement 56, and thus through port 54 to the spinner assembly 16. The unique arrangement of paddles 56 about threadless portion 52, in conjunction with helicoids 48 and 50, serves to retard passage of granular material through port 54 when the invention is not in operation. In the absence of this arrangement, granular material would tend to flow through port 54 until tailgate 28 could be closed by the dump truck operator, thus wasting valuable material. On the other hand, paddles 56 serve to assist the auger 42 in propelling granular material through the discharge port 54 when the invention is operative.

Further assurance against the leakage of granular material through port 54 is provided by a blocking plate 57 disposed in well 14 between delumper bar 34 and auger 42, above port 54 (FIGS. 3 and 5). Plate 54 is secured to the long walls of well 14 by suitable means such as rivets 59 and extends to each side of port 54 a sufficient distance so as to form an angle of 45° or less between the edge of port 54 and the edge of plate 57, with respect to the bed of well 14, as indicated at 61 in FIG. 3. 45° is figured as the maximum angle of repose of granular material in well 14.

The power source for auger 42 and delumping shaft 44 is conveniently supplied by an hydraulic motor 58 secured within a housing 60 adjacent sprockets 40 and 46. A sprocket 62 is secured to the drive shaft of motor 58, exteriorly of housing 60, and a drive chain 64 around sprockets 40, 46 and 62, through divider wall 66, completes the power train. Hydraulic motor 58 is of the conventional type, being fed by input line 68 and exhaust line 70, and may be operated in the usual fashion from controls conveniently mounted in the drive cab of the dump truck (not shown).

Spinner plate assembly 16 includes a pair of mounting brackets 72, 72, a protective housing 74, spinner plate 76, and a second hydraulic motor 78. The arrangement of the housing 74 between the rear of the truck and the spinner plate 76 and extending partially rearwardly at the right (as seen in FIGURE 1) protects the truck from the scattered material and serves to direct it over the desired area. Each bracket 72 includes a pair of journals 80, 80, welded to the under surface of well 14, a journalled bracket 82 secured to the top of housing 74 and a shaft 84 through journals 80, 80, and bracket 82. The shaft may be retained in position by convenient washer and cotter pin means 86. The top of housing 74 is formed with an entry funnel 88, for receiving granular material from exit port 54 in well 14. The granular material then falls on the spinner plate 76 which includes a plurality of vanes 90 for scattering the granular material from the invention. Hydraulic motor 78 provides rotational power for spinner plate 76, and includes input line 92 and exhaust line 94, for motive fluid supplied in the same fashion as that to hydraulic motor 58.

Variations in speed and volume of granular material to be projected from spinner assembly 16, may be controlled by independent operation of hydraulic motors 58 and 78 and by varying the point of impingement of granular material on vanes 90 from port 54. This is accomplished by provision of a sliding plate 96 having a central opening 98 therein located generally beneath port 54. The plate is slidable in the direction of the length of well 14 and is held in face relationship thereagainst by means of a bracket 100, welded or otherwise suitably attached to the forward, bottom edge of well 14, which forms a slot 102 for receiving one edge of plate 96, and a pair of thumb screws 104, 104, threadably received in well 14 through horizontal, longitudinal slots 106, 106 in plate 96. As can be seen in FIGURE 3, the diameter of opening 98 is substantially less than that of port 54. By selective loosening and tightening of thumb screws 104, 104, plate 96 may be shifted from the position shown in FIG. 3 to the right so that granular material will strike vanes 90 nearer the outer circumferential edge of plate 76.

As shown in FIGURE 3, granular material will fall from port 54 through funnel 88 to strike vanes 90 near the center portions thereof, where the radial speed of plate 76 is reduced with respect to the outer edge of plate 76. Thus, material will be projected only a short distance from spinner assembly 16. To increase the velocity, and therefore the relative distance of travel of the granular material, it is only necessary to move the plate 96 to the right with respect to FIGURE 3, thereby causing granular material to strike vanes 90 near the outer edges thereof, where the radial speed of plate 76 is greater.

It will be noted that the arrangement of bracket assembly 72 permits housing 74 to pivot freely about the axis of shafts 84, 84 so that spinner assembly 16 will remain in a horizontal position while the load box of the dump truck is raised or lowered.

The unique cover plate arrangement 26 is best illustrated by FIGS. 1, 2 and 5. Cover 26 is formed of two flat plates 108 and 110 hinged together at 112. Plate 108 is further hingedly secured along the upper, rear edge of well 14. Plate 108 is also provided with a pair of exteriorally mounted journals 111, 114, at either upper end thereof, mating with lugs 116, 116, one to each upper outer end of end plates 18. A pair of keys 118, 118 through lugs 116 and journals 114 serves to maintain cover 26 in an upright, vertical position, plate 110 folded inwardly against plate 108. This permits tailgate 28 to abut against cover 26 when the invention 12 is in use and further serves to prevent spillage of granular material over the rear edge of well 14. If desired, tailgate 28 may be provided with a pair of baffle plates 120, 120 to prevent overflow of granular material between tailgate 28 and sidewall 24, above end plate 18.

When it is desirable to use dump truck 10 in the usual fashion, well 14 may be effectively blocked by cover 26 by removing keys 118, 118, and unfolding cover 26 in the manner illustrated in FIG. 2. This permits material of any description to pass over the top of the invention, and negates the need of removing the invention from the dump truck when the invention is not being used. Additionally, spinner assembly 16 may be detached easily by removing cotter pins and washers 86, thereby permitting removal of shafts 84, 84.

While the invention as hereinbefore described is designed primarliy for the broadcasting of granular material, it may also be used for laying a ribbon of material by replacing spinner assembly 16 with a chute (not shown) having appropriate brackets thereon for mating with the bracket assembly 72 at the bottom of well 14, adjacent port 54.

It can be seen from the foregoing that I have developed an extremely new and useful device in the art of granular material spreading devices, and therefore I am not to be limited to the exact construction as herein provided, except as may be within the scope of the following claims.

I claim:

1. A device for spreading granular material from a vehicle-mounted load box having a top-pivoted, rear end gate holding said material, comprising:

(a) an elongated, granular material reception well mounted at the discharge portion of the load box, a rotatable auger within said well, first drive means for said auger, a discharge port in said well below said auger, said auger having at least one helicoid feeding toward said discharge port;

(b) a spinner assembly suspended beneath said discharge port for broadcasting granular material, pivotally mounted for swinging movement about an axis at right angles to the line of vehicle travel, the assembly including a vertically arranged spindle and a plate horizontally arranged thereupon for rotation, a plurality of radial vanes on the upper face of said plate, second drive means on said spindle, flow discharge adjusting means for varying the opening of said discharge port linearly along a radius of said plate to change the point of impingement of material discharged from said port, upon said horizontal plate; and (c) a movable cover, selectively positionable, in a first horizontal position to excluude movement of granular material from the load box to the well and a second, relatively vertical position, cooperating with the end gate of the vehicle load box to direct and confine movement of granular material from the load box in to the well, said movable cover comprising:

(1) a first flat cover plate, hingedly secured along the upper, rear edge of said reception well;

(2) a second flat cover plate hingedly secured to said first and second cover plates being of dimensions equal to the open portion of said well when said cover is in a horizontal position; and (3) means for securing said cover in an open, vertical position comprising a pair of vertical end plates, secured one to each lateral end of said well, and a pair of detachable securing means, one to each vertical edge of said end plates for securing said first cover in a vertical position, the second flat cover being folded against said first cover when said cover is in a vertical position.

2. The combination of claim 1 including a rotatable shaft in said well parallel to and above said auger, and radial lugs on said shaft for breaking up lumps of said granular material.

3. The combination of claim 1 wherein said auger includes a threadless portion adjacent the discharge port, and a plurality of radial paddles, extending outwardly of the threadless portion of the auger, said paddles being of substantial width axially along said threadless portion, thereby to propel granular material when the auger rotates and to impede its flow when the auger is idle.

4. The combination of claim 1 including a shroud in the spinner assembly facing the vehicle to prevent scattering of granular material in the forward direction of vehicle travel and a funnel on the upper part of the assembly for directing granular material from the discharge opening to the spinner plate.

5. The combination of claim 1 wherein said well is provided with a horizontally disposed feed discharge blocking plate, secured in the well over said auger above the discharge port, said blocking plate having a sufficient length to prevent flow of granular material in said well through the discharge port when said device is inoperative.

6. A device for spreading granular material from the load box of a vehicle including a reception well, an auger in said well, means defining a discharge port beneath said auger in the well, a spinner assembly for broadcasting granular material located beneath said discharge port, said auger having at least one helicoid for directing granular material to said port, said spinner assembly including a rotatable, circular plate having radial vanes thereon, pivot means securing said spinner assembly to said well, beneath said port, and flow discharge adjusting means for varying the opening of said port linearly along a radius of said plate thereby varying the point of impingement of granular material on the face of each of said radial vanes, first power means for driving said auger, second power means for driving said circular plate, and a movable cover, selectively positionable, in a first horizontal position to exclude movement of granular material from the load box to the well and a second, relatively vertical position, to direct and confine movement of granular material from the load box into the well, said movable cover comprising a first flat cover plate, hingedly secured along the upper, rear edge of said reception well, a second flat cover plate hingedly secured to said first and second cover plates being of dimensions equal to the open portion of said well when said cover is in a horizontal position, and means for securing said cover in an open, vertical position comprising a pair of vertical end plates, secured one to each lateral end of said well, and a pair of detachable securing means, one to each vertical edge of said end plates for securing said first cover in a vertical position, the second flat cover being folded against said first cover when said cover is in a vertical position.

7. The device of claim 6 wherein said well includes a rotatable delumper bar, driven by said first power means, and lugs, mounted on said bar for breaking lumps of granular material.

8. The device of claim 6 wherein said spinner assembly includes a housing, surrounding substantially a quadrant of said circular plate, to prevent broadcasting of the granular material on the vehicle, and a funnel on said housing for guiding granular material from said discharge port to said plate.

9. The device of claim 6 wherein said flow discharge adjusting means comprises a sliding plate, means defining an opening in said sliding plate, and means securing said sliding plate to said well, beneath said discharge port, said sliding plate being selectively positionable rectilinearly in the direction of the length of said well, said sliding plate opening located beneath said port.

10. The device of claim 9 wherein the diameter of said sliding plate opening is less than the diameter of said port, and said means securing the plate to the well comprises an elongated bracket, attached to the forward edge of the bottom of said well, forwardly of said port, one edge of said sliding plate received in said bracket, in face to face relationship with the outer surface of said well, a pair of horizontal slots formed in said sliding plate near an edge opposite said one edge thereof, and a pair of screws mounted one through each slot to said well for selectively positioning said sliding plate on said well, thus allowing selective positioning of said sliding plate opening beneath said port.

References Cited

UNITED STATES PATENTS

| | | | |
|---|---|---|---|
| 2,442,743 | 6/1948 | Wester | 239—687 |
| 2,882,060 | 4/1959 | Speicher | 239—687 |
| 3,189,355 | 6/1965 | Swenson et al. | 239—665 |

FOREIGN PATENTS

| | | |
|---|---|---|
| 1,136,691 | 12/1956 | France. |

EVERETT W. KIRBY, *Primary Examiner.*

U.S. Cl. X.R.

239—675, 676, 687